US008826325B2

(12) United States Patent
Redol et al.

(10) Patent No.: US 8,826,325 B2
(45) Date of Patent: *Sep. 2, 2014

(54) AUTOMATED UNOBTRUSIVE ANCILLIARY INFORMATION INSERTION INTO A VIDEO

(71) Applicants: Joao Redol, Lisbon (PT); Mauro Fernandes Lopes Lemos, S Domingos de Rana (PT); Rui Manuel de Jesus Vaz Luis, Porto Salvo (PT)

(72) Inventors: Joao Redol, Lisbon (PT); Mauro Fernandes Lopes Lemos, S Domingos de Rana (PT); Rui Manuel de Jesus Vaz Luis, Porto Salvo (PT)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,938

(22) Filed: Dec. 8, 2012

(65) Prior Publication Data
US 2014/0165093 A1 Jun. 12, 2014

(51) Int. Cl.
*H04N 7/10* (2006.01)
*H04N 21/81* (2011.01)
(52) U.S. Cl.
CPC .................. *H04N 21/812* (2013.01)
USPC ................. 725/32; 725/34; 725/36

(58) Field of Classification Search
CPC .......... H04N 21/812; H04N 21/23424; H04N 21/4532; H04N 21/2668; G06Q 30/0241
USPC ...................................... 725/32–36
See application file for complete search history.

(56) References Cited

U.S. PATENT DOCUMENTS

| 8,009,965 B2 * | 8/2011 | Takao ........................... 386/249 |
| 2007/0162927 A1 * | 7/2007 | Ramaswamy et al. .......... 725/36 |
| 2007/0204223 A1 * | 8/2007 | Bartels et al. ................. 715/540 |
| 2009/0079871 A1 * | 3/2009 | Hua et al. ...................... 348/584 |
| 2011/0296457 A1 * | 12/2011 | Hamilton ....................... 725/34 |

* cited by examiner

*Primary Examiner* — Mark D Featherstone
*Assistant Examiner* — Jen-Shi Huang
(74) *Attorney, Agent, or Firm* — Selwyn S. Berg

(57) ABSTRACT

An improved computerized process for an AUTOMATED UNOBTRUSIVE ANCILLARY INFORMATION INSERTION INTO A VIDEO is described that inserts an advertisement into a moving object in a video selected by a user by an algorithm which requires no manual operations by the advertising business entity. A user who has access to any computer hardware device chooses his selected video but sees on his monitor that selected video with an advertising segment inserted in some optimum placement on that moving object in the selected video by an optimizing subroutine so that the insertion-does not distract from the -content of interest to the viewer.

5 Claims, 5 Drawing Sheets

Dynamically Inserted Advertisement in Successive Frames
Animated pictorial showing the placement of an Advertising Segment (AD marker) on moving objects in consecutive frames of a Seclected Video Figure 2 (sheet 1 of 3) 400 Adhandler Process 2
FIGURE 2 (sheet 1 of 3) 400 Adhandler Process 2
The subroutine of the Processes to select the optimum adverting location in the selected video

Figure 2B

FIGURE 2 (sheet 2 of 3) 400 Adhandler Process 2
The subroutine of the Processes to select the optimum adverting location in the selected video

Figure 2C

FIGURE 2 (sheet 3 of 3) 400 Adhandler Process 2
The subroutine of the Processes to select the optimum adverting location in the selected video FIGURE 3 Dynamically Inserted Advertisement in Successive Frames
Animated pictorial showing the placement of an Advertising Segment (AD marker) on moving objects in consecutive frames of a Seelected Video

AUTOMATED UNOBTRUSIVE ANCILLIARY INFORMATION INSERTION INTO A VIDEO

REFERENCES CITED

Issued Patents

US2009/0079871 A1 Hua et al. Mar. 26, 2009 ADVERTISMENT INSERTION POINTS DETECTION FOR ONLINE VIDEO ADVERTISING
US 2007/0162927 A1 Ramaswamy et al. Jul. 12, 2007 METHODS AND APPARATUS FOR MONITORING THE INSERTION OF LOCAL MEDIA CONTENT INTO A PROGRAM STREAM 1
US 2007/0204223 A1 Bartels et al. Aug. 30, 2007 METHODS OF AND SYSTEMS FOR PERSONALIZING AND PUBLISHING ONLINE CONTENT
US-2011/0296457 Hamilton Dec. 1, 2011 CONVERGED COMMUNICATION SERVER
U.S. Pat. No. 8,009,965 B2 Takao Aug. 30, 2011 VIDEO ANALYZER AND COMPUTER PROGRAM PRODUCT
US 2010/0312608A1 Shan et al. Dec. 9, 2010 CONTENT ADVERTISEMENTS FOR VIDEO This Specification, AUTOMATED UNOBTRUSIVE ANCILLIARY INFORMATION INSERTION INTO A VIDEO is a Continuation In Part to the Parent Patent, REAL TIME AUTOMATED UNOBTRUSIVE ANCILLIARY INFORMATION INSERTION INTO A VIDEO, U.S. Pat. No. 8,578,407 B1 (application Ser. No. 13/545,198 of priority date Jul. 10, 2012) which is incorporated by reference to the following Specification as if substantially repeated herein. This Application claims priority of the Parent Patent under 35 USC §119(e).

BACKGROUND OF THE INVENTION

1). Proposed Field Classification

The field of invention is primarily in CLASS 345 COMPUTER GRAPHICS PROCESSING AND SELECTIVE VISUAL DISPLAY SYSTEMS and CLASS 725 INTERACTIVE VIDEO DISTRIBUTION SYSTEMS in subclasses 32 to 36, and involves CLASS 348, Television and CLASS 707, Data processing: database and file management or data structures. The potential subclasses are too numerous to mention as data processing covers many sub-disciplines.

2). Introductory Information and Related Art

Advertising is a main sources of revenue for internet companies (Sources) operating communication channels on the ubiquitous Internet. Some companies have their operation based solely on advertising income. With the constantly growing number of communication devices (e.g.: Smart TV set, a mobile device, a laptop, a PC or a tablet), the target audience is accessible over many of these communication channels. The Internet is the central communication provider of the Sources using these various communication channels and advertising is the main way the Sources make a profit. Targeting potential customers (USERs) connected with their mobile communication devices to the Internet has made inserted digital media advertising a major avenue to get public exposure. However, the usual approach of using pop-ups has been so distracting and annoying to USERs, all communication devices have internal programs to block them. Therefore, new methods to target the public has to be used to get to these USERs. These USERs can be accessed 24 hours a day on many different communication devices all connected at one information communication channel.

A) Prior Art.

The rapidly growing area of digital video presentations has produced a crowded art of somewhat ambiguous innovations. There are many patents that show the various ways of inserting advertising into computer compatible cinematography. The novel distinction of the Parent Patent is the feature of inserting advertisements or logos into the video per se. The major improvement of this CIP specification is the feature of inserting an advertisement logo into a moving object in the video per se. For example, if a football hero is shown in active motion about to obtain a winning goal, it may be possible to put an advertiser's logo on the shirt of the moving player. Such presentation may be less intrusive and more effective than cutting away to an advertisement clip to the demise of the action football scene.

In general, the prior art that does put advertisements into a User selected video places the advertisement by frame insertion instead of insertion of the advertisement into the content within the video frame. Several related patents abstracted from the crowded art and referenced above are quite different from the invention herein disclosed.

In US Patent 2011/0296457 A1 (December, 2011) titled "Converged Communication Server With Transaction Management" uses streaming to match advertising content to the interests of the viewer into a video selected by a viewer. The objective of this patent is matching several advertisements to the cost of the selected video so as to offset the cost to the viewer. This patent does not unobtrusively embed the advertisement.

US Patent 2007/0162927 A1 (Jul. 12, 2007) titled "Methods and Apparatus for Monitoring the Insertion of Local Media Content into a Program Stream" formulates tagging methods narrowing the advertisements to the interests selected by the viewer. This invention does not deal with integrating an advertiser's information into a user selected video, US Patent 2007/0204223 A1 (Aug. 30, 2007) titled Methods Of And Systems For Personalizing And Publishing Online Content" does not deal with the insertion of advertising information into the selected video of the viewer, but analyzes the verbal metadata history of the user by permitting the user to interactively alter that metadata. By contrast, the following Specification deals with the content of the selected pictorial information and performs sophisticated parsing by analyzing individual pixels for image content and not just word content. The Specification does not require any manual personal metadata input from the user.

U.S. Pat. No. 8,009,965 B2 (Aug. 30, 2011) titled "Video Analyzer and Computer Program Product" describes a computer analysis to detect advertising commercials in order to cut them from the received video. The described algorithms determine scene boundaries to create clips of video. The invention does not claim any procedure for inserting a commercial into that original video presentation.

US 2010/0312608A1 (Dec. 9, 2010) titled "Content Advertisements For Video" of Shan et alia also presents a method for placement of an advertisement in a user selected video. However, said Patent is claim restricted to placing only a text message into an area that is blanked from the selected video and remains static in position. Moreover, the quiet area is determined by a Gaussian variance to determine its significance instead of absolute pixel byte content of color and placement employed in the following CIP Specification The Inventors are aware of the work done by Inventors Hua et alia and did briefly comment on referenced Patent US 2009/0079871 A1 (Mar. 26, 2009) titled "Advertisement Insertion Points Detection For Online Video Advertising.

These "Insertion Points" are locations where at least one second full video (advertisement) clip is inserted into the first video splitting that video into two clips. By contrast, the following CIP Specification and parent patent inserts the commercial message into the original video without breaking the action of that video The unique improved feature of the following CIP Speciation is the insertion of the advertising segment into some blank object in the selected video content which then can move through each frame of the selected video content avoiding possible collision with interest areas. As mentioned in this section's introductory paragraph above, this feature also allows the advertisement to be coupled to a monochromatic pixel defined area within the frames so as to move along within such defined area-neither obfuscating the content of interest in the video nor being incompatible with the background of the video content. This feature also makes the video content and video advertising simultaneous and collateral. Such a feature of simultaneous duality contrasts sharply with most of the prior art which shows consecutive video clips at break points in a selected video.

The Inventors recognize the conflicting myriad of patents which employ common domain computer algorithms but they are also immersed in the technology and therefore recognize the uniqueness of their synergistic utilization of these algorithm tools which are known to those in the art. In the Parent Patent and following CIP Specification description, the primary commercially attractive method permits the insertion of an advertisers statement or logo into a video selected by a viewer in a place in the selected video which does not contain information of interest; i.e.,—action. As detailed in the following Specification and Claims, this is accomplished by a pixel analysis (or parsing) to find sequences of pixel words that do not change significantly from video frame to frame. It is a parsing within each frame of the video to find the location spot. The plethora of existing patents reviewed does not accomplish the same results the applicants have achieved in their shop with the Parent Patent and following CIP Specification.

INVENTION SUMMARY

An objective of the following invention and its Parent Patent is in implementing an efficient architecture with a non obtrusive algorithm of embedding advertisements into a USER selected digital video content. The advertisement can be an Advertising Segment which may be either a playlet promoting the product or brief advertising text (as would be found on a poster sign) or—in the alternative—a Logo which has secondary meaning associated with the product. Such advertising should blend non-intrusively with the inherent video digital media content (the Selected Video) so as not to obfuscate the true video experience while maximizing revenue for Advertisers and Sources. The flattened presentation appears on the USER's Monitor which may be any kind of device that has an operating system and display such as mobile phones, tablets as well as computers.

The algorithm invention of the Parent Patent and following Specification embodies the method and algorithm which allows a USER connected to a communication channel to watch video digital media (Selected Video) with embedded non-obtrusive advertising digital media (Advertising Segment or Logo), both in real-time events or transcribed events. The algorithm operates in three modes: static scene mode, dynamic scene mode and dual video mode. The following CIP Specification describes the dynamic scene mode. All the process routines/subroutines to accomplish the objective in this invention are well established but subject to various descriptive idioms used in computer programming. However, these subroutines become synergistic in that they produce a novel result that is greater than the constituent parts.

In the Parent Patent and this description of the invention, the USER of some software application (firmware) which is installed on his digital device merely downloads from the Internet the desired Selected Video media and with that selected video digital media also obtains promotional Advertising Segment material from some Advertiser as if that Advertising Segment or Logo were part of the original content of said selected video digital media.

This invention can be applied to any software application such as IPTV, VoD and video streaming with any encoding (e.g. avi, mp4), on any digital communication channel and using any type of receiving communication device.

The program is user friendly in that the USER either has the application firmware for acquiring video digital media or he installs the necessary program/firmware. That firmware performs a real time automated unobtrusive ancillary information insertion into a video without any human intervention. Commercially, that ancillary information is intended to be advertising. The USER may be required to enter the usual sequence of registering by password. The USER may then choose from a list of available content video digital media for his Selected Video. The USER will have the usual buttons to control sound quality and screen presentation. However, when the advertisement shows up in the USER's selected video digital media, he will be able to manually click on a button or the Logo to display or store the Advertising Segment pertaining to the business of the Advertiser. This is a routine procedure known and used by all who use any of the available communication devices. The algorithm selects the place for the advertising information without any human intervention, and puts said advertising in a prominent, but unobtrusive place so as not to interfere with the likely action of interest in the USER's Selected Video.

Overall Basic Description of the Invention Processes

The invention components primarily comprises (A) network solution architecture of the overall algorithm for the AUTOMATED UNOBTRUSIVE ANCILLIARY INFORMATION INSERTION INTO A VIDEO, (B) an Adhandler Process for processing the advertisement which is either Adhandler Process 1 (described in the Parent Patent) or Adhandler Process 2 (described in the following Specification) insertion method for digital video content advertisement insertion and (C) Widget Process and Embedder Process presentation method for viewing simultaneously the selected video digital media content with inserted advertising digital media. Each of these programming steps is briefly described as follows—
A). Network Solution Architecture Illustrated in FIG. 1.

Figure 1:
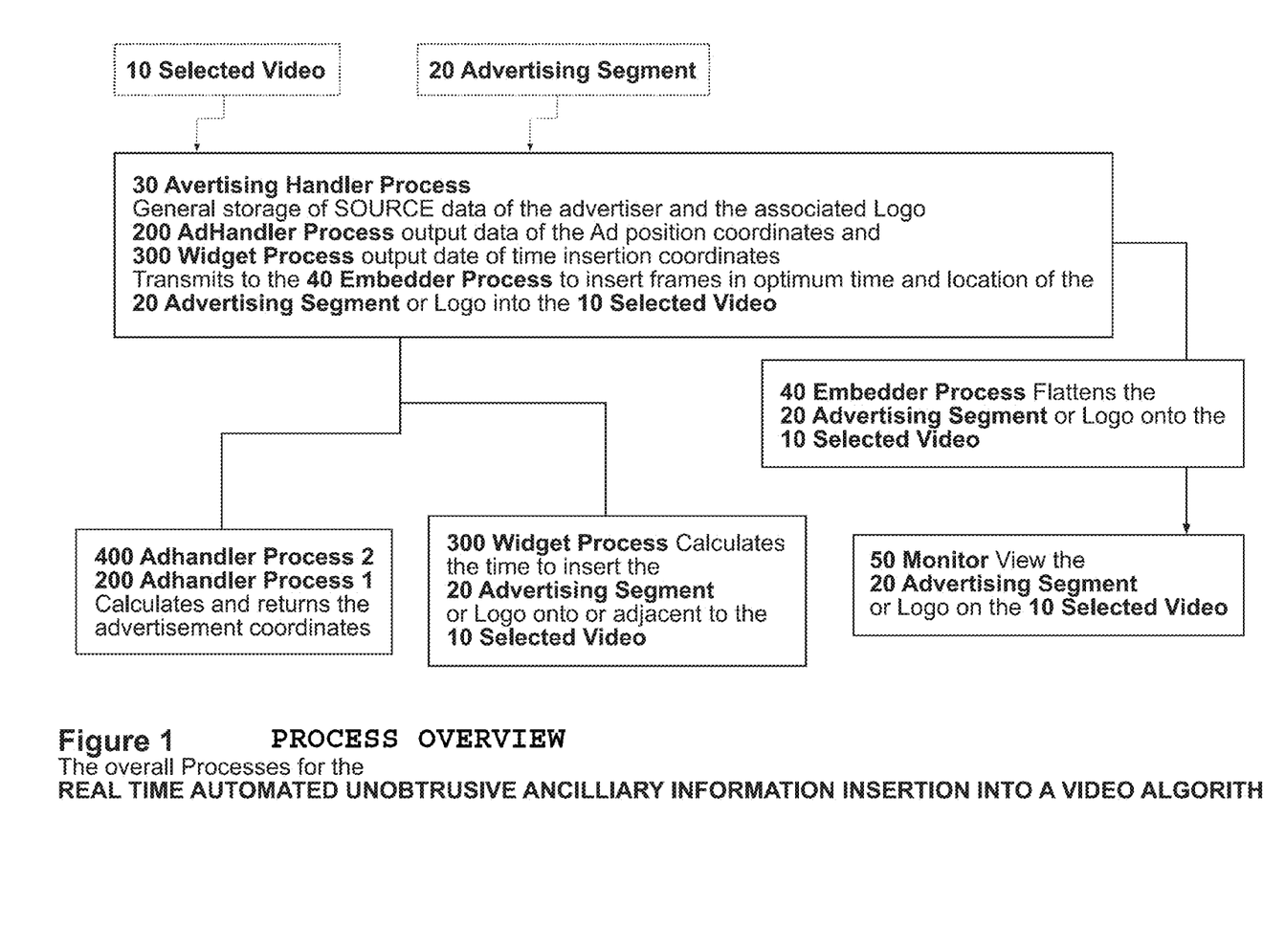
FIG. 1 of the PROCESS OVERVIEW is a general description of the Processes that comprise the overall algorithm to obtain the bottom line resultant flattened combination of the input codecs of 10 Selected Video and 20 Advertising Segment to the viewer's 50 Monitor

The architecture for the overall algorithm has 5 Processes of
   30 Advertising Handler Process
   40 Embedder Process
   200 Adhandler Process 1 (described in the Parent Patent) and 400 Adhandler Process 2 (described in the following Specification)
   300 Widget Process
as well as the primary input of the 10 Selected Video and 20 Advertising Segment and the necessary output 50 Monitor (which is any device which includes all the usual USER hardware & software found in all retailed computers). These Processes contain subroutines which contain the following necessary information I. a global advertisement provider (SOURCE) which stores all metadata about
  a) the advertisement, the producer of the product (AD-VERTISER)
  b) the target user (USER) (e.g.; name, age, location, gender),
  c) the USER profile (e.g. what the user prefers).
  And an internal program which stores the correlations between all this data.
  This information is all stored in the listings associated with the Advertising Segment.

II. A global content provider (SOURCE) which, stores all digital medial content (the original movie digital media of the 10 Selected Video and the inserted advertising digital media of the 20 Advertising Segment by its encoded identification). It is from this SOURCE that the user obtains his Selected Video.

III. A distributed software algorithm that
  connects to both providers,
  correlates information and
  the AUTOMATED UNOBTRUSIVE ANCILLIARY INFORMATION INSERTION INTO A VIDEO algorithm for showing the video content to the user with the advertisements seamlessly embedded in the digital video content.

The advertisement content showed to the user is automatically and intelligently determined by public domain correlation software as to be that which promotion is most relevant to that target user.

B). General Insertion Method of the Dynamic 400 Adhander Process 2

The static advertisement location detection and insertion processes for placing advertisements into an User Selected Video is described in the Parent Patent. The 200 Adhandler Process 1 either finds a static location to put the advertisement/logo or splits the screen into isometric sections for dual presentation by the 300 Widget Process. The following CIP Specification of the 400 Adhandler Process 2 describes the dynamic advertisement location detection and insertion of an advertisement/logo placement into a moving object in the User Selected video.

The insertion method is accomplished by decomposing the video digital media content of a scene into a series of consecutive frames and then finding/identifying an advertisement place/location which will receive a layer containing the correlated advertising digital media for this USER. Additionally and most importance:
  the insertion method works on real time without any type of off-line preprocessing;
  the insertion method works automatically;
  the insertion method intelligently finds/identifies the best non-intrusive spatial-temporal advertisement location.
The insertion method does not require any kind of manual intervention.

Detailed Insertion Method Description for 400 Adhandler Process 2

The 400 Adhandler Process 2 is the process algorithm for a dynamic insertion of advertisement into a User Selected Video:

The 400 Adhandler Process 2 is an universal system for inserting a 20 Advertising Segment into a scene when an adequate grouping of (position) static pixels is not determined in respect to time interval or pixel position, but there is a section of apparently contiguous pixels from frame to frame of a scene. This group of pixels is best described as having inherent constant spatial format (ICSF) encoding which is independent of time. Such pixels do not change within certain limits of color and relative position in each succeeding frame of a scene. The end result is a definition of a strip of constant color that is contiguous across several successive frames of a video clip. This is useful in a panned scene where a section of pixels which are relatively constant in color and proximity appears to move across the video screen as a consequence of a panning camera. A similar pixel situation exists when a moving object (such as a car or section of clothing on a person) moves in a continuous film clip. The ICSF is converted into white space for the possible insertion of the 20 Advertising Segment if the strip occupies enough frames to be of adequate viewing time interval. Having now defined the path for the 20 Advertising Segment the residual black and white sections in each selected frame is converted to transparent so the layer containing this inserted 20 Advertising Segment can be inserted over the 10 Selected Video for flattening. In the broader application, the 20 Advertising Segment can be made to travel across the video screen with the action of the 10 Selected Video without interfering with the action events of interest; i.e., the moving players and the ball in a sport scene of a 10 Selected Video.

The 400 Adhandler Process 2 performs a series of steps in order to find one or more non-intrusive locations inside the 10 Selected Video. These locations will then be used for advertising insertion of the 20 Advertising Segment, providing to the USER a seamless integration between the digital media and advertising content during his watching experience.

The 400 Adhandler Process 2 analyzes the 10 Selected Video digital media content and chooses locations based on areas with absence of apparent ICSF pixel change, ordered by the time which the frames remain visible to the USER. Priority locations are picked in terms of duration time and displayed position as which are more effective for displaying the 20 Advertising Segment. A path of pixels is mapped for the 20 Advertising Segment across several frames and that path jogs with an encounter with some conflicting motion action within the 10 Selected Video so as to assure continuity across enough frames to have a usable duration for the 20 Advertising Segment.

Finally, this 400 Adhandler Process 2 employing the findings from the described process, inserts the composed advertising 20 Advertising Segment digital media layer which is flattened by the 40 Embedder Process onto the top of the 10 Selected Video digital media content. The composition assures a fit in time and space.

Detailed Insertion Method Steps within the Several Processes for the 400 Adhandler Process 2:

The insertion method performs a series of steps which are described as follows:

1. Using established video programming techniques the insertion method captures a finite N amount of frames from the video digital medial content; where N is the mathematics symbol for the integral number of contiguous frames which conform to the size and shape geometry of the required space that will accommodate the information to be inserted.

2. Each frame N is analyzed by:
  2.1. Converting the frame to a new $N(X_n)$ filtered to black and white frame, where white space represent area with absence of movement and black space represent area with movement.
  2.2. For $N(X_1)$, randomly find non-overlapping m sided polygon shaped locations which is identified by Y with a configurable Z area, inside the white space and then store the location L(Yn) for each Y—Step 1.
3. For each N(X$_2$ ... Xn), check if each Y location L(Yn) is still valid, i.e. it is still inside white space of Step 2.
   3.1. If it is valid continue analyzing next N(Xn).
   3.2. If it is not valid:
      a) Check if location L(Yn) is invalid due to a collision with movement, (i.e., black space overlapping) by performing an adjustment to the location of Y in a configurable radius R and checking if the new location L(Y') is then valid:
         If L(Y') is valid continue analyzing next N(Xn) and add the new location L(Y') to the list of Y locations L(Yn).
         If L(Y') is not valid:
            If Y visibility path, i.e. L(Yn) matches the visibility duration criteria VD, add Y location to the list of video locations V(Yn).
            If Y visibility path, i.e. L(Yn) does not match the visibility duration criteria VD, discard Y.
4. While the list of Y locations is not empty return to Step 2.
5. When there are no more locations Y, repeat Step 1 and continue to Step 2 and repeat the above sequence until the digital media content ends.
6. After analyzing the last frame of the scene, converting all the residual black and white pixels to transparent to produce a scene segment containing the advertising digital media.
7. Return the list of possible locations V(Yn) where the advertisement digital media content will be inserted.

In summary, the 400 Adhandler Process 2 described immediately above generates an optimum video sequence placement path for a compatibly sized advertisement in a white space of ICSF pixels in consecutive frames. These consecutive frames must constitute a video clip with a time interval to satisfactorily display the advertisement. Then these black and white frames are converted to a transparent layer to overlay in the Selected Video which is flattened by the 40 Embedder Process. The 400 Adhandler Process 2 presentation algorithms allows the viewing of the video content chosen by the user and video advertising simultaneously even if the computer selected space is in motion.

BRIEF DESCRIPTION OF THE FIGURES

The algorithm of FIG. 1 is a literal logical statement of a functioning system composed mostly of public domain subroutines. The call-outs in the figures follow the declarative programming paradigm. Each subroutine performs specific logical tasks and is titled by Underlining. Those versed in the video programming art recognize the procedural programming involved which are generally in the public domain. The combination of these subroutines are defined as processes and defined in Bold Format. The several Processes of Subroutines are synergistic in that they provide a novel algorithm which permits the automated insertion of prepared advertising media (20 Advertising Segment) into the user selected video (10 Selected Video) without obscuring the content of interest to the viewer of that selected video. Both the 10 Selected Video and 20 Advertising Segment are in some common codecs which are to be decoded and surveyed in the succeeding Processes. Each Process is defined by the particular Subroutine associated with that Process. The Adhandler Process 1, described in the Parent Patent, is limited to the placement of the Advertising Segment onto a static object in a Selected Video. The Adhandler Process 2, described in this CIP Specification, is an improvement that describes the placement of the Advertising Segment onto a moving object in a Selected Video.

FIG. 1

FIGS. 2A, 2B and 2C

The composite FIG. 2 of FIGS. 2A, 2B and 2C illustrate the 400 Adhandler Process 2 showing the subroutines for processing a video clip scene which has a sectional area of contiguous pixels which do not significantly change in color but do change slightly in position in contiguous frames—this is the dynamic mode.

FIG. 3

DETAILED DESCRIPTION OF THE FIGURES AND THE INVENTION

In Conjunction with the above explanation of the holistic interactive functioning of the algorithm to achieve a real time AUTOMATED UNOBTRUSIVE ANCILLIARY INFORMATION INSERTION INTO A VIDEO, the following description describes the interactive functioning of the claimed invention.

FIG. 1. Process Overview

FIG. 1, titled PROCESS OVERVIEW shows the interactions between the principal PROCESSES. Shown are the input subroutines of the 10 Selected Video and the 20 Advertising Segment. These inputs are fed through the 30 Advertising Handler Process to either the 400 Adhandler Process 2 or 200 Adhandler Process 1 (described in the Parent Patent) and 300 Widget Process which places 20 Advertising Segment in a split screen (also discussed in the Parent Patent). The frames of the input are then sent to the 40 Embedder Process which outputs those frames to the 50 Monitor of the USER.

The 30 Advertising Handler Process is quite trivial in that it is a store and switch data bank to distribute bottom line information to the other processes which manipulate the data. Likewise, the 40 Embedder Process is also a public domain algorithm which flattens the video inputs into a single video display according to the prior processed data of time and space blending. In the alternative, it has the public domain screen select subroutine which responds to a select & click of the Logo to present the stored 20 Advertising Segment information to the 50 Monitor.

The subroutine operations of the 40 Embedder Process, 300 Widget Process and the 30 Advertising Handler Process are described in more detail in the Parent Patent. This CIP explains the improvement to the Parent Patent and is programmed to work seamlessly with it for the maximum versatility for an advertisement presentation to a USER.

FIG. 2: The 400 Adhandler Process 2

Figure 2A:
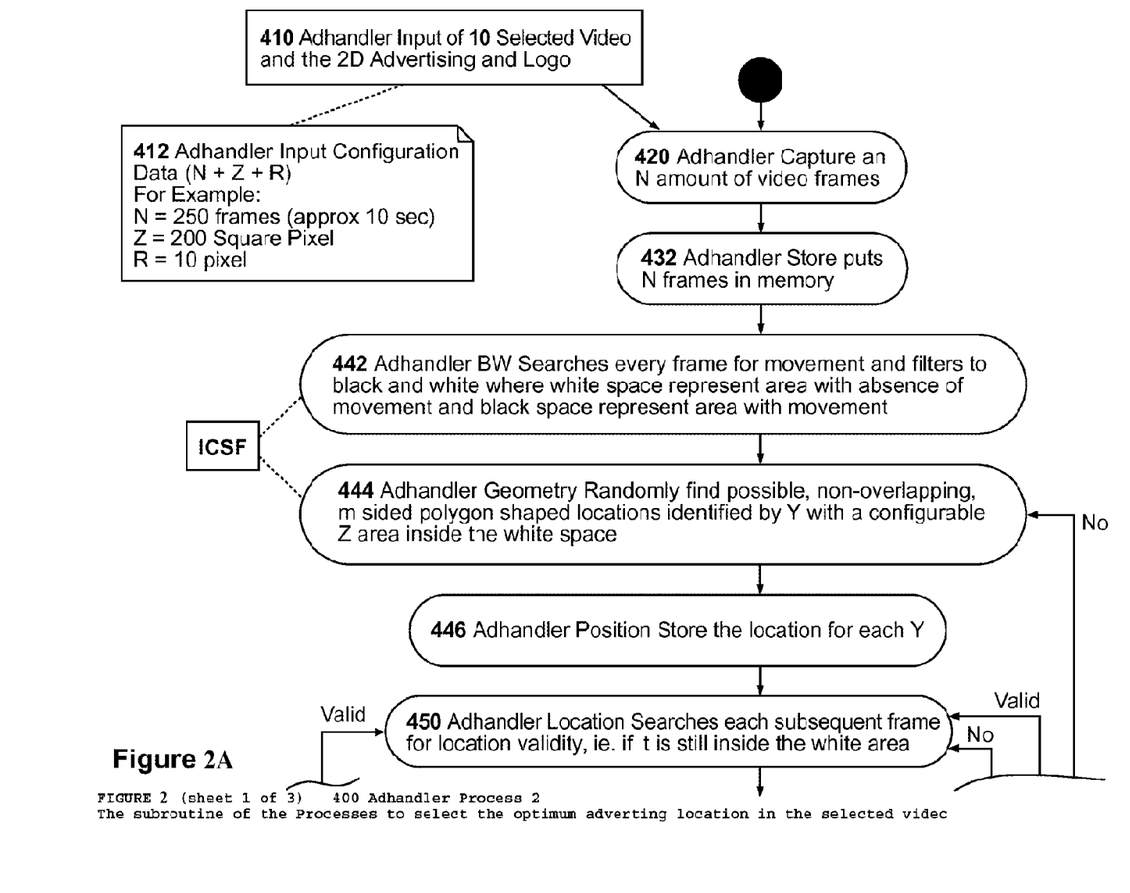
Figure 2B:
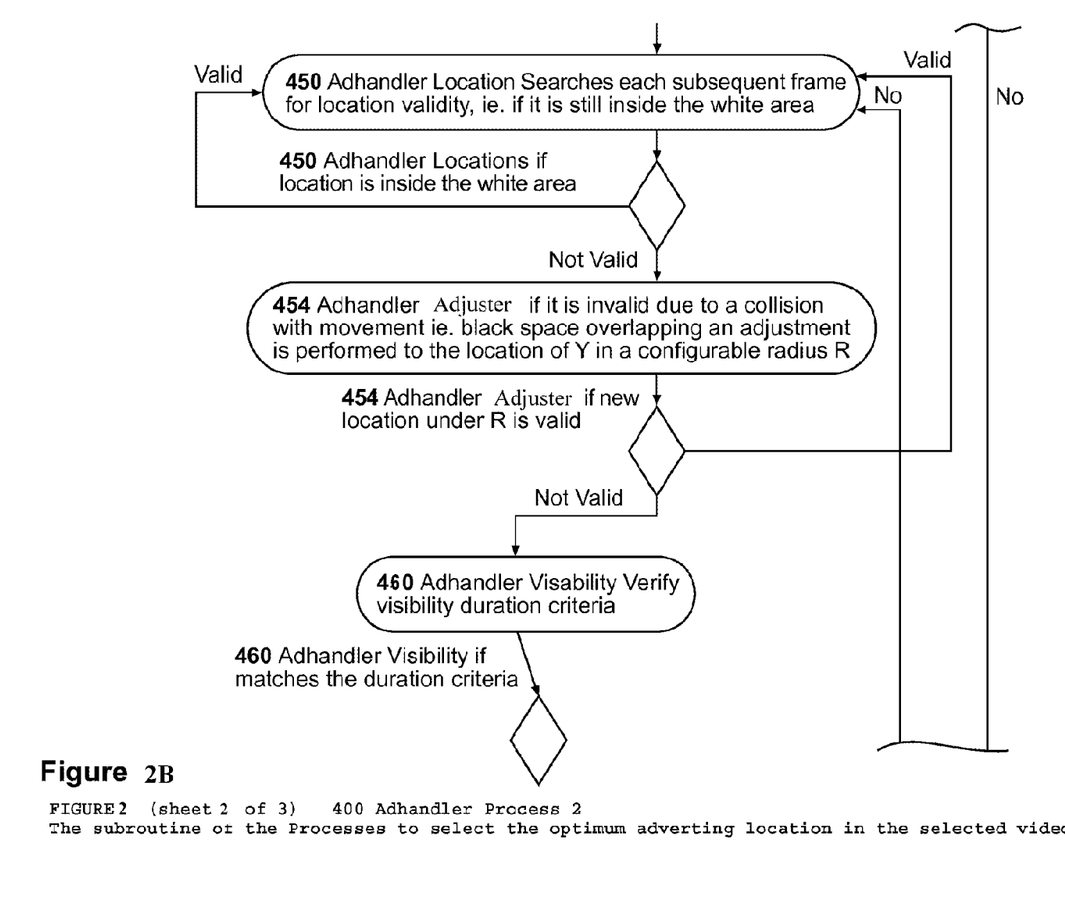
Figure 2C:
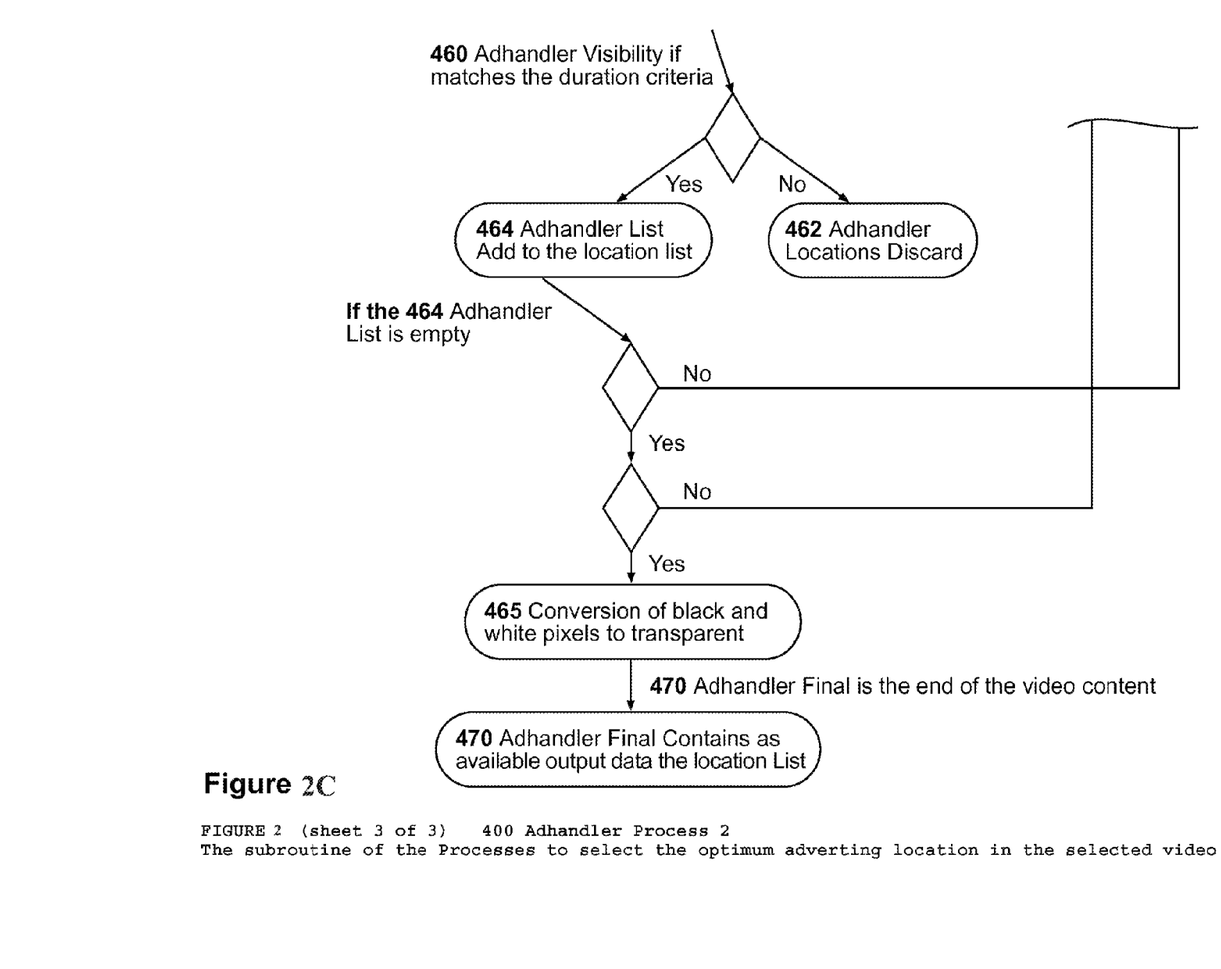

FIG. 2 is a composite illustration of FIGS. 2A, 2B and 2C which shows the subroutines for processing a scene which do not significantly change in color but do change slightly in position in contiguous frames—this is the dynamic mode. The objective of the subroutines in this 400 Adhandler Process 2 is to determine the spatial coordinates of the pixels so as to insert the Logo or the 20 Advertising Segment in a least obtrusive, but most effective, path in the 10 Selected Video.

The 400 Adhandler Process 2 does processing in the dynamic scene mode. In the dynamic scene mode, no adequately sized pixel group maintains the same geometric position for an adequate time interval covering succeeding frames for the insertion of an advertisement. The objective of the subroutines in this 400 Adhandler Process 2 is to determine the spatial coordinates of the pixels so as to insert the Logo or the 20 Advertising Segment in the least obtrusive, but most effective, position of the 10 Selected Video when the clip of the 10 Selected Video contains so much motion that no satisfactory area from frame to frame contains a grouping of unmoving matching contiguous pixels.

To obtain this objective for determining location data to be placed into the 470 Adhandler Final output, the 10 Selected Video and the 20 Advertising Segment and Logo are initially placed in the 410 Adhandler Input. This 410 Adhandler Input has a 412 Adhandler Input Configuration of standardized number of frames, resolution, color and the like. The 420 Adhandler Capture subroutine grabs N amount of video frames which is stored in the 432 Adhandler Store for processing by the ICSF which makes the necessary pixel modification that connects each seceding frame within a scene compatible with the elected Logo or the 20 Advertising Segment to the dynamic 10 Selected Video. The logical task of the ICSF is to seek pixels which remain static in color and proximity to each other from those that do not and distinguish them. If between seceding frames there is a change in color at a particular pixel location, such change indicates motion and likely to be action content in the 10 Selected Video of interest to the viewer. The distinguishing pixel tagging is accomplished by converting the apparent moving pixel group to black and convert the static color pixels to white. Therefore subroutine 442 Adhandler BW does the search and conversion to black and white. When this is completed, the 444 Adhandler Geometry seek the frame boundaries of polygon shaped locations which are identified as a Y and Z configurable area of white space.

These new frames are output to the 446 Adhandler Position as available locations for the 20 Advertising Segment or Logo.

Since there are a number of possible locations, the 446 Adhandler Position information is input to the 450 Adhandler Locations subroutine as the output source for the optimum pixel location in a compatible white area so the Logo or the 20 Advertising Segment fits. If it does not, the 454 Adhandler Adjuster subroutine makes readjustments by selecting a new path for the Logo or the 20 Advertising Segment. This seeking of a new path may require a feedback to the 450 Adhandler Locations subroutine. The 460 Adhandler Visibility subroutine is a "go or no-go" routine that either establishes the 464 Adhandler List that assures the time duration requirement is met for the Logo or the 20 Advertising Segment or it is to be sent to the 462 Adhandler Locations Discard. If the 464 Adhandler List is empty, the logic chain returns to 444 Adhandler Geometry. If the seeking of pixels is not at the end of the scene, the analysis continues by going back to 450 Adhandler Locations subroutine for the next frame. If the last frame of the scene has been checked, the path of white pixels receives the 20 Advertising Segment (or logo) and the residual black and white pixels in each of the frames are converted to transparent pixels in the 465 Conversion. The result is the creation of a moving segment scene containing the 20 Advertising Segment which goes to the 470 Adhandler Final and is layered and flattened by the 40 Embedder Process. The 400 Adhandler Process 2 is now a algorithm process for selecting a path across several frames in the scene of a 10 Selected Video for the most effective moving/dynamic placement of either the 20 Advertising Segment or Logo. This choice is made without any real time external manipulation.

Figure 3:
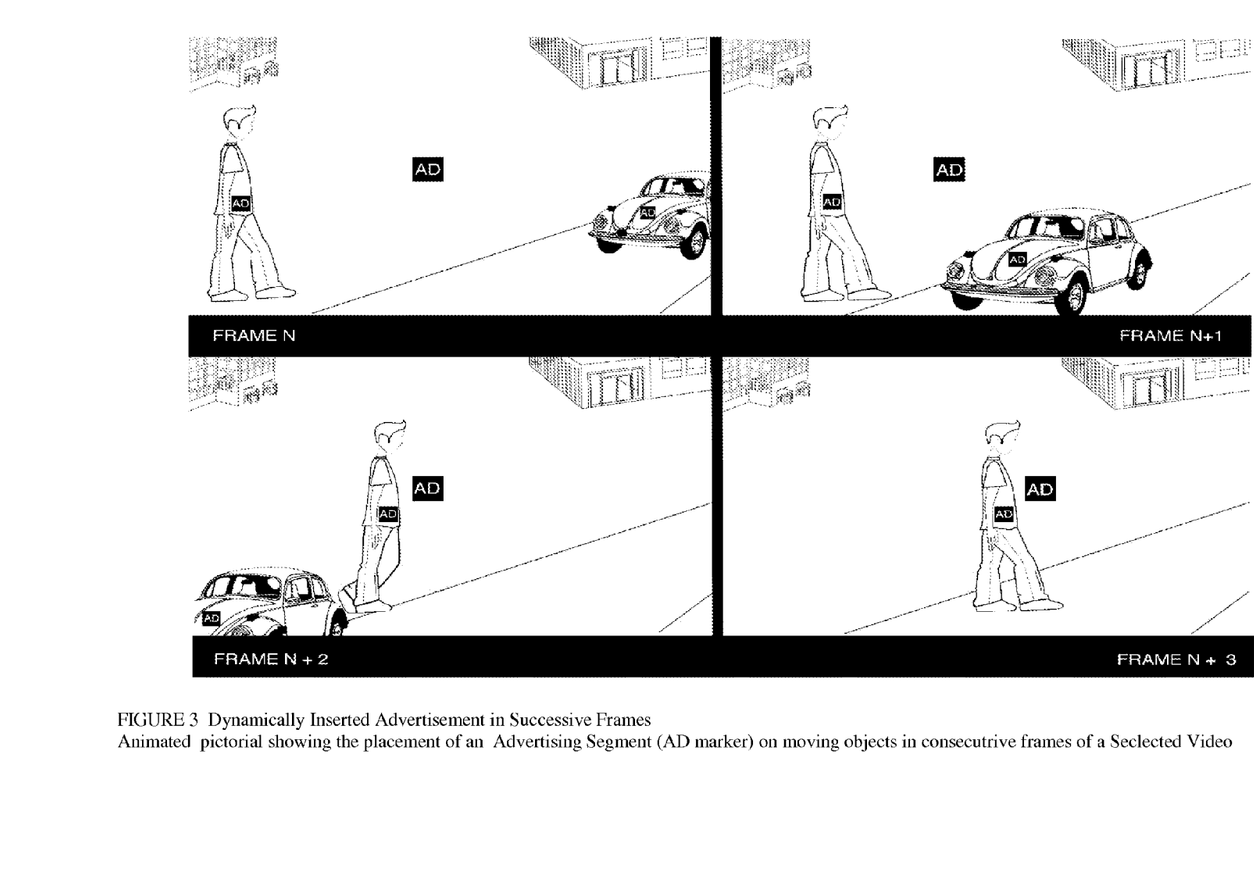
FIG. 3 is an animated pictorial showing the automatic placement of a 20 Advertising Segment (shown as the AD marker) on moving objects within four consecutive time lapsed frames of a User Selected Video

FIG. 3 Dynamic Insertion of Advertisement

FIG. 3, titled DYNAMIC INSERTION OF ADVERTISEMENT shows an Advertising Segment (AD) which has been inserted into a moving object in several successive frames of a Selected Video. Both the moving vehicle and the walking man have had the advertisement layered onto them by the comprehensive algorithm methods described in this Specification.

SPECIFICATION GLOSSARY

| GENERAL TERMS USED IN THIS SPECIFICATION Proper Nouns used in this Specification | |
|---|---|
| WORD | definition |
| Adhandler Process | algorithm for finding insertion place of Advertising Segment in Selected Video |
| Advertiser | primary customers for Sources |
| Advertising Segment | playlet, logo or brief adverising text |
| ICSF | inherent constant spatial format encoding which independent of time |
| Inventors | applicants of the within Specification |
| Logo | Advertiser insert figure having secondary meaning |
| Monitor | device that has a operating system and display |
| Parent Patent | U.S. 2013//8578407 B1 |
| Selected Video | a video presentation selected by the USER |
| Sources | internet companies |
| Specification | specification of within application #13/708938 |
| USER | potential consumer customers |
| N | the mathematics symbol for the integral number of contiguous frames which conform to the size and shape geometry of the required space that will accommodate the information to be inserted. |
| Adhandler Process 1 | described in incorporated by reference Parent Patent |
| Adhandler Process 2 | dynamic algorithm described in Specification |
| Advertising Handler Process | compatability algorithm to allow the insertion of Advertising Segment in Selected Video |
| Bold Format | subroutines are defined as processes |
| Embedder Process | algorithm to flatten the layer of Advertising Segment in Selected Video |
| Processes | algorithm Subroutines |
| Widget Process | algorithm for splitting the screen, described in the Parent Patent |

| Algorithm Routines | General Function |
|---|---|
| 10 Selected Video | Viseo presentation selected by the USER |
| 20 Advertising Segment | Commercials mutually appropriate to USER & Advertiser |
| 200 Adhandler Process 1 | Process algorithm for static placement of an advertisement |
| 30 Advertising Handler Process | Process algorithm to store and switch data to the other processes. |
| 300 Widget Process | Algorithm to split a screen |
| 40 Embedder Process | Process algorithm to flatten the advertisement to the video |
| 400 Adhandler Process 2 | Process algorithm for moving/dynamic placement of an advertisement |
| 50 Monitor | any device which includes all the usual USER hardware & software found in all retailed computers |

| ADHANDLER PROCESS 2 Subroutines | |
|---|---|
| Specification Designation Lexography | Function |
| 410 Adhandler_Input | Storage of selected video and advertisement |
| 412 Adhandler_Input Configuration // | Conversion to insertion format |
| 420 Adhandler_Capture | Captures video frames for possible advertisement insertion |
| 432 Adhandler_Store | Stores the captured frames |
| 442 Adhandler_BW //ICSF | ICSF pixel analysis for black/white conversion |
| 444 Adhandler_Geometry | ICSF analysis for geometry to accept advertisement |
| 446 Adhandler_Position | Selected positions in the frames for the advertisement |
| 450 Adhandler_Locations | Holding index to put the advertisement |
| 454 Adhandler_Adjuster | Makes fine adjustments for the optimum motion path |
| 460 Adhandler_Visibility | Check for compatability of advertisement to selected video |
| 462 Adhandler_Locations Discard | Holding cell for rejected processed frames |
| 464 Adhandler_List | Selected frame grouping for the advertisement |
| 465 Conversion | Converts the black and white areas to a transparent layer |
| 470 Adhandler_Final | Holds the location information for the layer to be inserted in the USER Selected Video |

We claim:

1. A process algorithm for performing an automated unobtrusive ancillary information insertion into a video for inserting an advertising segment into a moving object within contiguous frames of a selected video which is displayed on a monitor by cooperative of an adhandler process by both
   an advertising handler process which holds said advertising segment of an advertisement geometry and an advertisement time interval, and
   an embedder process for flattening image layers from said adhandler process where said adhandler process performs steps comprising:
   capturing from said selected video a plurality of contiguous frames;
   encoding said contiguous frames for compatibility with said algorithm into a plurality of N contiguous frames where N is the mathematics symbol for the integral number of contiguous frames which conform to the size and shape geometry of the required space that will accommodate the information to be inserted;
   transforming pixels that change color in each frame of said plurality of said N contiguous frames to a black pixel space;
   transforming pixels that do not change color in each frame of said plurality of said N contiguous frames to a white pixel space;
   outlining in each frame from said white pixel space a geometric of shape and size where each said geometric is partially interspaced with an adjacent geometric among said N contiguous frames;
   nesting successive said geometrics into a nested plurality white pixel space;
   selecting from said nested plurality white pixel space a minimum geometric white pixel space;
   measuring dimensions of said minimum geometric white pixel space as an indexed white space dimension;
   evaluating the time interval for a video clip of said nested plurality white pixel space;
   determining a requisite white pixel space of dimensions, geometry and time interval of said advertising segment being held in said advertising handler process which is adequate to accept said advertising segment as an insertable advertising segment;
   listing said nested plurality white pixel space which can enclose said insertable advertising segment as a potential placement location;
   selecting from said potential placement location an optimum video sequence location;
   inserting said advertising segment into said optimum video sequence location converting said black pixels space and said white pixels space to transparent pixels to create an advertisement image layer;
   stacking successive plurality of said advertisement image layers over said selected video at said optimum video sequence location to create a stacked video advertisement clip of said selected advertisement over frames in said selected video, and
   conveying said stacked video advertisement clip to said embedder process for flattening;
   whereby an optimum video sequence display of said advertising segment appears to move along a path in said selected video at a location that neither obfuscates the dynamic content of interest in the selected video nor is incompatible with the background.

2. A process algorithm for performing an automated unobtrusive ancillary information insertion into a video as described in claim 1 with said advertising segment consisting of a logo where said adhandler process further performs an additional processing step comprising:
   electing a magnification and time interval for said logo to be displayed as said advertisement image layer in said optimum video sequence location of said selected video;
   whereby said advertising segment is seamlessly layered on said moving object in said optimum video sequence location.

3. An algorithm for performing an automated unobtrusive ancillary information insertion into a video as described in claim 1 with said advertising segment consisting of a text where said Adhandler Process further performs an additional step comprising:
   electing a format and time interval for said text to be displayed as said advertisement image layer in said optimum video sequence location of said selected video whereby said advertising segment is seamlessly layered on said moving object in said optimum video sequence location.

4. An algorithm for performing an automated unobtrusive ancillary information insertion into a video as described in claim 1 with said advertising segment consisting of an advertisement video clip of a plurality of successive frames where said adhandler process further performs an additional step comprising:
   matching each advertising frame with a frame of said selected video whereby said advertising segment is seamlessly layered on said moving object in said optimum video sequence location.

5. A device that performs an automated unobtrusive ancillary information insertion into a video to insert an advertising segment into a selected video for viewing on a monitor employing assemblies of:
   an advertising handler process assembly for storage of metadata and said advertising segment, and
   an adhandler process assembly which parses said selected video for pixel coordinates by decomposing said selected video media content into a series of consecutive video frames and then seeks pixel bytes of color and position, and an embedder process assembly which flattens said advertising segment onto said selected video where said adhandler process assembly comprises subassemblies of:

an adhandler input subassembly which stores said selected video and said advertising segment and outputs to an adhandler input configuration subassembly which accepts converts said selected video and said advertising segment to a compatible format of video frames and advertisement frames to transmit to an adhandler capture subassembly which captures said video frames of said selected video for possible advertisement insertion which is indexed to an adhandler store subassembly which stores said captured video frames for serially transmitting to an adhandler black and white converting subassembly which parses each successive pixel of said captured video frames according to an inherent constant spatial format encoding analysis for converting a pixel color change to a black pixel and no pixel color change to a white pixel and then conveys to an adhandler geometry subassembly which parses each pixel of said white pixels according to an inherent constant spatial format encoding analysis to create an advertisement geometric area among said white pixels to accept advertisement and to an adhandler position subassembly which selects said advertisement geometric area as potential advertising position in said captured video frames for said advertisement segment which is held in an adhandler locations subassembly which holds an index of said advertising positions to put said advertisement segment which is juxtaposition by an adhandler adjuster subassembly which makes fine adjustments of said advertising positions to define the optimum motion path which is limited by an adhandler visibility subassembly which checks for temporal and special compatibility of advertisement to said selected video for possible distribution to either an adhandler locations discard subassembly which holds rejected processed frames or an adhandler list subassembly which selects an optimum frame grouping of said advertisement geometric area for said advertising segment and inserts frames of said advertising segment into said optimum frame grouping and then is transmitted to a conversion subassembly which converts said black pixels and said white pixels to a transparent pixels and this converted frame with a frame of said advertisement segment as an advertisement layer is stored in an adhandler final subassembly which retains location information for said advertisement layer to be inserted in said selected video and said location information combined with said selected video and said advertisement layer is placed in said embedder process assembly for flattening whereby said advertising segment is combined as an integral part of a moving object in said selected video without distracting from the sequence of said selected video content.

\* \* \* \* \*